D. W. DAVIS.
Process of Preparing and Preserving Fish.

No. 226,390.  Patented April 13, 1880.

Attest:
F. H. Schott
F. S. Blanchard

Inventor
David W. Davis
By N. Crawford
atty.

United States Patent Office.

DAVID W. DAVIS, OF DETROIT, MICHIGAN.

PROCESS OF PREPARING AND PRESERVING FISH.

SPECIFICATION forming part of Letters Patent No. 226,390, dated April 13, 1880.

Application filed January 2, 1880.

*To all whom it may concern:*

Be it known that I, DAVID W. DAVIS, of the city of Detroit, in the county of Wayne and State of Michigan, have made certain Improvements in the Process of Preparing and Preserving Fish in a Fresh State for Market and Domestic Use, of which the following is a specification.

Heretofore fish have been prepared for market and for keeping by freezing them either single or in cakes of such form as to be packed, when frozen, in barrels, half-barrels, or other forms of packages; but the object of this invention is to freeze the fish in the packages used for transportation, such as barrels, half-barrels, or boxes, after being packed in pulverized, ground, or finely-broken ice, in such manner as that the ground ice shall completely separate the fish or keep them from contact with each other; and the invention consists in the method or process of accomplishing the object as above stated.

Figure 1:
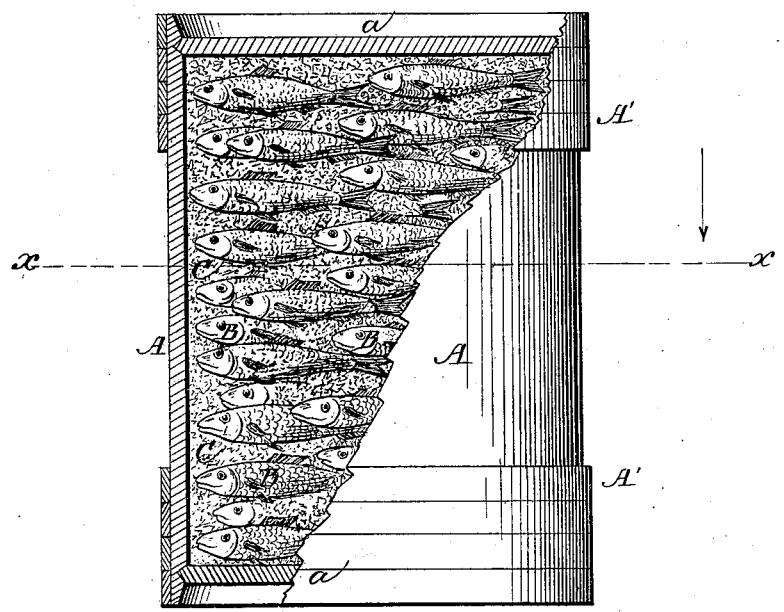
Figure 2:
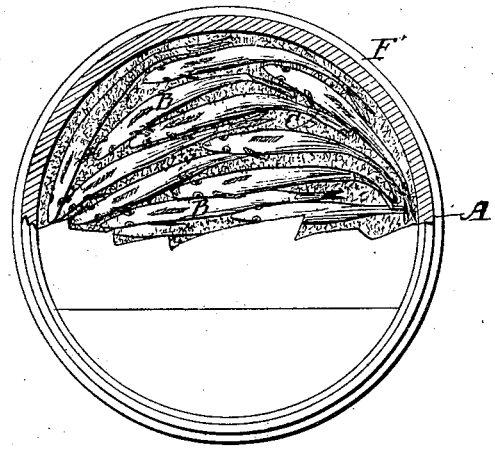

In the drawings, Figure 1 represents a barrel with one side partly broken away to expose the manner of packing the fish therein, and Fig. 2 represents a transverse sectional view on line *x x* of Fig. 1.

A represents a barrel or cask of any desired size, and having hoops A'; or, instead of a barrel or cask, the package containing the fish may be a box of any desired size or form.

*a a* represent the heads of the cask or barrel, or the ends of a box, if the fish are packed in a box.

B B represent the fish as just taken from the water, and as they are packed in barrels or boxes in pulverized, ground, or finely-broken ice in such manner as that the ground or broken ice, shall keep the fish separated from each other, or so that one fish shall not be in contact with another.

C is the ground or finely-broken ice between and around the fish, placed in such way as to completely keep the fish from touching each other or the sides of the package. When the fish are so packed the package containing them is subjected to a refrigerating process, which freezes the fish solid in their bed of finely-broken or ground ice, and when they are so frozen they will remain in the same condition so long as the temperature of the surrounding air is below the freezing-point and for some time after the temperature is above said freezing-point.

Fish thus frozen and preserved have all the appearance of a fish just taken out of the water, as everything belonging to the fish is in the same condition that it was when alive in its native element, except that animation is suspended by the refrigerating process, and so long as they are kept in this state there will be no change in their shape, color, texture, or the taste of their flesh. Further, fish so preserved are always in condition to be retailed by a dealer, as they do not have to be thawed in order to be separated, as no two touch, and they are easily taken from the ground ice in which they are embedded without danger of breaking or in any way disturbing a scale or their color.

Fish preserved by this process can be transported with safety over long distances, and in summer-time, if placed in refrigerating-cars, (that are now common,) will keep equally as well as in winter, so long as the temperature is below the freezing-point, thus affording people at great distances from where the fish were caught the opportunity to have them served fresh upon their tables.

Having thus described my invention, what I claim is—

The process of preserving fish in a fresh state for market by first packing the freshly-caught fish in ground or pulverized ice, in suitable packages, then freezing the fish and pulverized ice together in a solid mass in the package, substantially as described.

DAVID W. DAVIS.

Witnesses:
ELISHA A. FRASER,
JNO. C. HOWLAND.